United States Patent
Pitman et al.

(10) Patent No.: US 10,393,455 B2
(45) Date of Patent: Aug. 27, 2019

(54) METHOD OF CLEANING A HEAT EXCHANGER

(71) Applicant: INEOS EUROPE AG, Vaud (CH)

(72) Inventors: Gary Pitman, Stirling (GB); Kevin Ramsay, West Lothian (GB)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/903,332

(22) PCT Filed: Jul. 15, 2014

(86) PCT No.: PCT/EP2014/065134
§ 371 (c)(1),
(2) Date: Jan. 7, 2016

(87) PCT Pub. No.: WO2015/010957
PCT Pub. Date: Jan. 29, 2015

(65) Prior Publication Data
US 2016/0146557 A1 May 26, 2016

(30) Foreign Application Priority Data
Jul. 22, 2013 (EP) .................................... 13177447

(51) Int. Cl.
| B08B 7/00 | (2006.01) |
| F28G 9/00 | (2006.01) |
| B29B 9/06 | (2006.01) |
| F28G 13/00 | (2006.01) |
| B08B 3/10 | (2006.01) |
| F28D 21/00 | (2006.01) |
| B29B 9/16 | (2006.01) |

(52) U.S. Cl.
CPC .................. *F28G 9/00* (2013.01); *B08B 3/10* (2013.01); *B08B 7/0071* (2013.01); *B29B 9/065* (2013.01); *F28G 13/00* (2013.01); *F28G 13/005* (2013.01); *B29B 9/16* (2013.01); *F28D 2021/0031* (2013.01)

(58) Field of Classification Search
CPC .......... F28G 9/00; F28G 13/00; F28G 13/005; F28D 2021/0031; B08B 3/10; B08B 7/0071
USPC ............ 134/19, 22.15, 34, 105, 107, 111, 2, 134/22.17, 22.19, 29; 252/79.1–79.4; 264/39
See application file for complete search history.

(56) References Cited

U.S. PATENT DOCUMENTS 3,544,525 A 12/1970 Blaint et al.
3,776,774 A * 12/1973 Miller ..................... B29C 48/92
134/7

(Continued)

FOREIGN PATENT DOCUMENTS

| CN | 1618833 A | 5/2005 |
| EP | 2 051 031 A1 | 4/2009 |
| JP | S56-51235 A | 5/1981 |

*Primary Examiner* — Binh X Tran
*Assistant Examiner* — Christopher Remavege
(74) *Attorney, Agent, or Firm* — Nixon & Vanderhye P.C.

(57) ABSTRACT

Method for treating a heat exchanger which in operation is used to cool process water which has been in contact with polymer particles. The method includes passing to the process side of the heat exchanger a treatment stream while the heat exchanger is at an elevated temperature compared to the temperature when the heat exchanger is in operation.

17 Claims, 1 Drawing Sheet

(56) References Cited

U.S. PATENT DOCUMENTS

| | | | | |
|---|---|---|---|---|
| 3,865,628 | A | * | 2/1975 | Callahan .................. C09D 9/00 134/2 |
| 4,385,016 | A | * | 5/1983 | Gwinn .................... B29B 9/065 264/142 |
| 4,593,748 | A | | 6/1986 | Kramb |
| 5,485,858 | A | * | 1/1996 | Schmidt .................. B29C 33/72 134/105 |
| 5,706,841 | A | | 1/1998 | Were et al. |
| 5,839,894 | A | | 11/1998 | Schedler et al. |
| 2005/0062186 | A1 | | 3/2005 | Fellinger |
| 2005/0154183 | A1 | | 7/2005 | Ekart et al. |
| 2008/0078293 | A1 | * | 4/2008 | Mizushima ............ B01D 47/05 95/229 |
| 2009/0028975 | A1 | * | 1/2009 | Eloo ....................... B29B 9/065 425/68 |
| 2010/0152341 | A1 | * | 6/2010 | Chatterjee ................ C08K 3/22 524/91 |
| 2010/0261835 | A1 | * | 10/2010 | Muller .................... C08L 23/02 524/587 |
| 2011/0172375 | A1 | * | 7/2011 | Yeh ........................ B01J 19/002 526/74 |
| 2012/0256341 | A1 | * | 10/2012 | Gloeckner ................ B29B 9/16 264/140 |
| 2014/0140894 | A1 | * | 5/2014 | Bhandarkar ......... B01J 19/1818 422/132 |
| 2017/0341267 | A1 | * | 11/2017 | Sandholzer ............. B29B 9/065 |

* cited by examiner

METHOD OF CLEANING A HEAT EXCHANGER

This application is the U.S. national phase of International Application No. PCT/EP2014/065134 filed Jul. 15, 2014 which designated the U.S. and claims priority to European Patent Application No. 13177447.3 filed Jul. 22, 2013, the entire contents of each of which are hereby incorporated by reference.

The present invention relates to heat exchangers, and in particular to treatment of heat exchangers, and most particularly heat exchangers used to cool water contaminated with polymer or polymer additives.

BACKGROUND OF THE INVENTION

Heat exchangers are widely used in industrial and other processes to either heat or cool one stream, often referred to as a process stream, using another, which may be referred to as a heating or cooling medium. The heat exchanger generally comprises one or more channels for the process stream and one or more channels for the heating or cooling medium, the channels being physically separated by walls. Heat transfer occurs through the walls from the hotter to the colder stream. The walls should therefore be made of a highly conductive material, and usually are made of metal. Stainless and other steels are commonly used.

The present invention relates to the treatment of a heat exchanger which in "operation" is used to cool a process water stream ("process water") using a cooling medium, and in particular for cooling process water which has been in contact with polymer particles. ("Operation" as used herein means when the heat exchanger is being operated in its normal or designed manner to cool the process stream.)

It has been found that certain constituents in the process water can be deposited on the walls of the heat exchanger. These can reduce the rate of heat transfer through the walls, which can reduce the effectiveness of the heat exchanger. This process is generally referred to as "fouling".

If the effectiveness of the heat exchanger at cooling the process water is reduced too much then it becomes necessary to stop and to clean the heat exchanger. In general terms, this can involve dismantling the heat exchanger and physically cleaning the surfaces. To maintain overall process operation one or more "spare" heat exchangers must then be provided which can be put "on-line" whilst others are being cleaned.

SUMMARY OF THE INVENTION

We have now found a process which provides an effective and simple cleaning of a heat exchanger without dismantling it.

Thus, in a first aspect there is provided a method for treatment of a heat exchanger which in operation is used to cool process water which has been in contact with polymer particles, which method comprises passing to the process side of the heat exchanger a treatment stream whilst the heat exchanger is at an elevated temperature compared to the temperature when the heat exchanger is in operation.

As noted above, "operation" as used herein means when the heat exchanger is being operated in its normal or designed manner to cool a process stream, in this case the process water. In such "operation" the heat exchanger may also be considered as being "on-line". "Process water" as used herein means an aqueous stream. The stream (process water) generally circulates in a process loop, a "process loop" as used herein being a series of process steps which are configured such that the process water circulates through the steps repeatedly (i.e. in a "loop"). The heat exchanger, in operation at least, will thus be one of the process steps in the loop. The heat exchanger will generally be operated to reduce the temperature of the process water to a desired temperature for a subsequent process step in the loop. There may be more than one heat exchanger present in order to cool the process water, but generally the process water is circulated in a loop and the overall heat exchange is designed to remove all of the heat which is gained at other steps in the loop and thereby maintain a steady process.

In the process of the present invention the process water has been in contact with polymer particles, in particular in a process loop. As a particular, and preferred, example the process water is used to convey polymer particles from one location to another and is then separated from the polymer particles and passed to the heat exchanger to be cooled prior to being used again.

A very particular, and most preferred, example is the use of process water for underwater pelletising operations. In underwater pelletising operations, molten polymer is extruded through a die into a strand which is cut to form polymer pellets. The pellets are extruded into process water (which may also be referred to as "quench water") which cools the pellets and conveys them away from the die. The water is heated by the pellets in this process.

Subsequently, the pellets are separated from the process water. The pellets are passed to finishing operations, whilst the process water is collected, cooled to remove the heat from the contact with the pellets and recycled for re-use. The process water thus circulates in a loop (a "process loop" or more specifically a "pellet water loop") from the extruder die to a pellet separation step, and then to a cooling step using a heat exchanger, and then back to the extruder die. It should be apparent that other steps may also be provided, such as filtration or buffer tanks for the process water.

The side of the heat exchanger to which the process water is passed in operation is referred to as the "process side". The other side of the heat exchanger, to which the cooling medium is supplied, is referred to as the "cooling side". The cooling medium is usually a second aqueous stream, in particular water. Such a stream is generally however "clean" in that it is not contacted with process components such as polymer.

It has been found that process water which has been in contact with polymer particles can lead to deposits which foul the process side of the heat exchanger.

The polymer particles with which the process water has been in contact may be particles of any suitable polymer. For example, the polymer particles may be of any polymer which may be known to be pelletised in an underwater pelletising operation. Preferred polymers include polyethylenes and polypropylenes.

The fouling has been found to be particularly acute when the polymer particles comprise certain additives which have been added prior to or during extrusion. Additives are often added to polymer during extrusion for example to give desired properties to the polymer, or to protect the polymer from degradation during the pelletising, finishing and/or subsequent storage. It is believed that small quantities of the additives can enter the process water and then cause or exacerbate the formation of deposits.

The additives which have been found to most cause or exacerbate the formation of deposits generally are those which are insoluble in the process water. The additives which most cause or exacerbate the formation of deposits and which are most amenable to removal using the treatment according to the present invention typically have a melting point of 45° C. to 110° C., such as of 50-100° C., and for example of 60° C. to 80° C.

Examples of commonly used additives which it has been found may cause the formation of deposits include fatty acid derivatives, such as derivatives of erucic acid and of oleic acid. Particular examples include erucamide and oleamide.

Up to 5000 ppm of such additives can be added to polymer prior to or during extrusion, typically 750-1500 ppm. (Said values being on a weight for weight basis.)

It has also been found that the rate of formation of deposits may be enhanced when such additives are present in the polymer in combination with a particulate component having a melting point in excess of the melting point of the additive. Such particulate components are generally also insoluble in the process water. They generally have a melting point in excess of the temperature when the heat exchanger is in operation. The particulate components preferably have a melting point of at least 100° C., for example of at least 120° C., and typically of at least 200° C. Examples of particulate components include silica, especially synthetic silica, diatomaceous earth and talc.

For example, up to 10000 ppm of particulate components may be added to polymer prior to or during extrusion. Typical ranges would be 300-2500 ppm for synthetic silica or 1000-8000 ppm for talc. (Said values being on a weight for weight basis.)

As one specific example, when the polymer particles comprise erucamide and synthetic silica, the rate of fouling has been found to be worse when the polymer particles comprise either component in the absence of the other.

It has been found that, surprisingly, such deposits can be removed by passing to the process side of the heat exchanger a treatment stream whilst the heat exchanger is at an elevated temperature compared to the temperature when the heat exchanger is in operation.

As used herein, the temperature of the heat exchanger during the operation and during the treatment refers to the temperature of the stream exiting the process side of the heat exchanger. Thus, in operation this is the temperature of the process water exiting the heat exchanger, whilst during the treatment it is the temperature of the treatment stream exiting the heat exchanger.

During operation, the temperature of the heat exchanger (i.e. the temperature of the process water exiting the process side of the heat exchanger) is typically from 20° C. to 50° C.

During treatment, the temperature of the heat exchanger (i.e. the temperature of the treatment stream exiting the process side of the heat exchanger) may be any suitable temperature higher than the temperature during operation, but is preferably from 50° C. to 100° C. with 50° C. to 80° C. being most preferred.

Preferably, during the treatment the heat exchanger is at a temperature at least 5° C. higher than the temperature when the heat exchanger is in operation. Typically, during the treatment the temperature of the heat exchanger is less than 50° C. higher than the temperature of the heat exchanger when it is in operation, and preferably less than 30° C. higher. More usually, during the treatment the temperature of the heat exchanger is 5° C. to 20° C. higher than the temperature of the heat exchanger when it is in operation.

It will be apparent that the temperature of the heat exchanger during treatment (as determined by the temperature of the treatment stream exiting the process side of the heat exchanger) can be adjusted by adjusting the temperature of the treatment stream entering the process side of the heat exchanger or by adjusting the flow or temperature of the cooling medium to the cooling side of the heat exchanger, or a combination of both can be used.

It is preferred that during the treatment less cooling is applied using the cooling medium, and in particular it is preferred that cooling medium is not passed through the heat exchanger during the treatment.

In a preferred embodiment the treatment stream is also an aqueous stream.

In one preferred embodiment, the aqueous stream may comprise fresh water. A particularly preferred stream is water which is added as "make-up water" to the process water loop. "Make-up water" is required to replace water that is lost from the process loop during operation. For example, incomplete separation of water from the pellets leads to a loss of water from the process with the pellets.

The fresh water is preferably heated prior to use as the treatment stream in order to attain the desired temperature in the heat exchanger.

In a second preferred embodiment the treatment stream may comprise, and most preferably is, a portion of the process water which is used in operation. For example, when the heat exchanger (which may be referred to as a "first heat exchanger") is initially in operation but is to be taken out of operation and treated, the majority of the flow of process water which is passed through the first heat exchanger during operation is instead routed to an alternate heat exchanger (or "second heat exchanger"), provided in parallel, and which will maintain the desired cooling to allow cooling of the process water to continue but with the alternate heat exchanger in operation. However, a small portion of the circulating process water may be separated from the main flow through the alternate heat exchanger and passed to the (first) heat exchanger as the treatment stream.

The temperature of the (first) heat exchanger during this treatment is increased compared to the temperature in operation by not passing cooling medium through the cooling side. (In particular, when the majority of the flow of process water is routed to the alternate heat exchanger instead of the first heat exchanger the flow of cooling medium can also be routed to the alternate heat exchanger instead of the first heat exchanger, so even though a lower flow rate of process water is passed to the heat exchanger the temperature still rises.)

Under these conditions it has been found that the process water, instead of depositing further deposits can act to remove the deposits and thereby clean the heat exchanger. A mixture of fresh water and a portion of the process water may also be used, or they may be used sequentially. For example, a portion of the process water may be used initially to reduce deposits, and fresh water used thereafter to reduce deposits further. One advantage of this is that the fresh water may be more easily heated to a higher temperature than is usually obtained from the use of a portion of the process water, which can also aid removal of deposits.

During the treatment step additives and/or particulate components are taken up in the treatment stream. The treatment stream, in particular when it is fresh water or a portion of the process water, may be joined with the process water (or "remainder" of the process water) to form part of the circulating process water. Although this can lead to the presence of the additives and/or particulate components back in the circulating process water, in general it has been found that a build-up of the additives and components is limited by losses of such additives and components with process water lost, for example with pellets exiting the process. Thus, the level of such additives and components reaches an equilibrium.

It is nevertheless possible to also provide a dedicated means to remove a small stream of process water and thereby control the levels. This may be referred to as a "purge". As a specific example a purge of process water can be taken and replaced by fresh water which will result in a reduction in level of additives and particulate components in the process water. The purge may be taken from, and the fresh water added to, any suitable location or locations on the process loop. A suitable location for both the purge and the fresh water addition would be a buffer tank.

In general terms it should be apparent that the method of the present invention requires that the heat exchanger is taken out of operation for treatment.

Thus, in a second aspect the present invention provides a process comprising:
1) Initially operating a heat exchanger to cool process water which has been in contact with polymer particles, said operation being performed at a temperature, $T_1$
2) Stopping the operation of step (1), and
3) Passing to the process side of the heat exchanger a treatment stream at a temperature, $T_2$, $T_2$ being higher than $T_1$.

The preferred features of this aspect, such as the temperatures of the heat exchanger during operation and during treatment, the polymer and the treatment stream are as described for the first aspect.

BRIEF DESCRIPTION OF THE DRAWINGS

A preferred embodiment of the present invention may be illustrated with respect to FIG. 1 which shows in schematic form a process water loop for underwater pelletising.

DETAILED DESCRIPTION OF THE INVENTION

Figure 1:
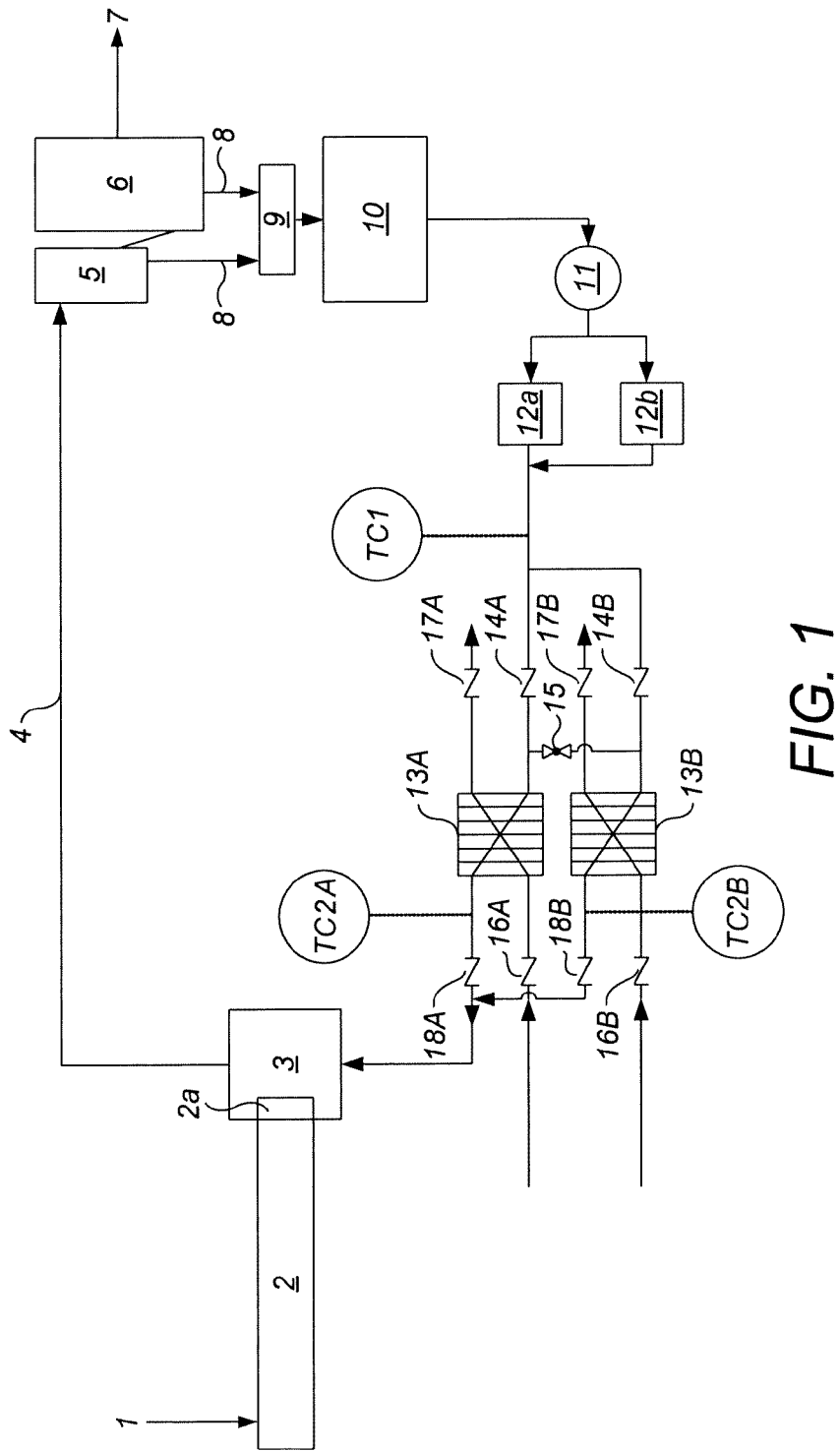

Thus, polymer 1 is passed to an extruder 2 having a die plate 2a. The polymer is melted in the extruder 2 and passed through the die plate 2a, then cut into pellets in a pelletiser 3. Pellets are pelletised underwater into a process water stream in which they are cooled/quenched. The process water stream and the pellets are passed via conveying line 4 to a dewaterer 5. The pellets and remaining water are passed to a dryer 6, and the pellets are then passed via line 7 to downstream processing and/or storage.

Separated water streams from the dewaterer 5 and the dryer 6 are passed by lines 8 via an optional filter screen 9 and then to a buffer tank 10 ("pellet water tank").

Water is passed from this using a pump 11 and via one of two optional further screens 12a/12b. (Filters 12a and 12b are optional as noted. It is preferred that filters 12a and 12b are used when filter screen 9 is absent.)

Two heat exchangers are provided in parallel. During one period of operation, process water is passed via valve 14A to heat exchanger 13A, whilst valve 14B, (to heat exchanger 13B) is closed. Cooling water is passed via valve 16A from a cooling water source (not shown) to the heat exchanger 13A, and exits via valve 17A to a cooling water recycle system (not shown).

Cooled process water exits heat exchanger 13A via valve 18A and is passed to the pelletiser (3) to convey further pellets. The temperature of the process water at the exit of the heat exchanger 13A may be measured by a temperature measurement device (TC2A).

After a period of operation it is desired to clean heat exchanger 13A. Valve 14B is opened and valve 14A is closed so that the process water stream is passed into heat exchanger 13B. Similarly valve 16B is opened and valve 16A is closed so that cooling water also passes to heat exchanger 13B. The pelletising process can thus continue using heat exchanger 13B to cool the process water stream.

In the process of the present invention a portion of the process water stream is passed as a treatment stream via valve 15 to the heat exchanger 13A. In the absence of the cooling flow via valve 16A the temperature in the heat exchanger 13A increases compared to that when it was in use of cool the process water stream ("operation") i.e. T2A increases.

This treatment/flow through valve 15 may be continued until heat exchanger 13B requires cleaning, in which case the process is returned to using heat exchanger 13A for the majority of the stream (and the flow to treat heat exchanger 13B can be obtained by flow the opposite way through the valve 15). However, flow through valve 15 may be stopped prior to this once treatment of heat exchanger 13A is complete.

As shown in FIG. 1, the temperature of the process water at the exit of the heat exchanger 13B may be measured by a temperature measurement device (TC2B). Alternatively, and although not shown, a single temperature measurement device can be provided at a location after the exits of the two heat exchangers are combined.

Also shown in FIG. 1 is a temperature measurement device (TC1) for measuring the temperature of the process water passed to the heat exchangers. As shown in FIG. 1 this is located prior to the junction by which the process water may be passed to either heat exchanger. Individual temperature measurement devices could instead be provided on the respective inlets to the two heat exchangers (13A and 13B) but in general individual temperature measurement provides no advantages. Another suitable location for a process water temperature measurement prior to the heat exchangers would be in the buffer tank (10).

The invention claimed is:

1. A method for treatment of a heat exchanger which in operation is used to cool process water which has been in contact with polymer particles, which method comprises passing to the process side of the heat exchanger a treatment stream whilst the heat exchanger is at an elevated temperature compared to the temperature when the heat exchanger is in operation, the treatment stream also being an aqueous stream, and wherein the polymer particles are selected from polyethylene and polypropylene particles and further wherein the polymer particles with which the process water has been in contact comprise additives which have been added prior to or during pelletising, which are insoluble in the process water and have a melting point of 45° C. to 110° C.

2. A method according to claim 1 wherein the process water is used to convey polymer particles from one location to another and is then separated from the polymer particles and passed to the heat exchanger to be cooled prior to being used again.

3. A method according to claim 1 wherein the process water is process water for underwater pelletising operations.

4. A method according to claim 1 wherein the polymer particles with which the process water has been in contact comprise erucamide and silica.

5. A method according to claim 1 wherein during the treatment the heat exchanger is at a temperature at least 5° C. higher than the temperature when the heat exchanger is in operation.

6. A method according to claim 1 wherein cooling medium is not passed through the heat exchanger during the treatment.

7. A method according to claim 1 wherein the aqueous stream comprises fresh water.

8. A method according to claim 7 wherein the fresh water is water which is added as "make-up water" to the process water.

9. A method according to claim 1 wherein the treatment stream comprises a portion of the process water which is used in operation.

10. A method according to claim 4 wherein during the treatment the heat exchanger is at a temperature at least 5° C. higher than the temperature when the heat exchanger is in operation.

11. A method according to claim 4 wherein cooling medium is not passed through the heat exchanger during the treatment.

12. A method according to claim 4 wherein the treatment stream is also an aqueous stream.

13. A method according to claim 12 wherein the aqueous stream comprises fresh water.

14. A method according to claim 13 wherein the fresh water is water which is added as "make-up water" to the process water.

15. A method according to claim 4 wherein the treatment stream comprises a portion of the process water which is used in operation.

16. A method according to claim 1 wherein during treatment, the temperature of the heat exchanger is from 50° C. to 80° C.

17. A method according to claim 4 wherein during treatment, the temperature of the heat exchanger is from 50° C. to 80° C.

* * * * *